United States Patent Office 3,173,896
Patented Mar. 16, 1965

3,173,896
PROCESS OF REACTING A POLYISOCYANATE WITH A COMPOUND HAVING ACTIVE HYDROGEN USING A TERTIARY AMINE N-OXIDE CATALYST
Rowland K. Adams, Brandywine Hundred, and John R. Cooper, Christiana Hundred, Del., assignors to E. I. du Pont de Nemours and Company, Wilmington, Del., a corporation of Delaware
No Drawing. Filed Oct. 21, 1960, Ser. No. 63,966
9 Claims. (Cl. 260—75)

This invention relates to a process of reacting an organic polyisocyanate compound with a compound having at least one Zerewitinoff-active hydrogen atom and more particularly to such a process wherein a tertiary amine N-oxide is employed as a catalyst.

It is an object of the present invention to provide a novel chemical process. A further object is to provide an improved process for reacting an organic polyisocyanate compound with a compound having at least one Zerewitinoff-active hydrogen atom. A still further object is to provide a new process for catalyzing the reaction of an organic polyisocyanate compound with a compound having at least one Zerewitinoff-active hydrogen atom wherein the catalyst is a tertiary amine N-oxide. Other objects will appear hereinafter.

These and other objects of this invention are accomplished by the process of reacting an organic polyisocyanate compound with at least one compound having at least one Zerewitinoff-active hydrogen atom, with the proviso that the reaction be carried out in contact with a tertiary amine N-oxide having no isocyanate reactable substituents, said N-oxide being selected from the group consisting of tertiary amine N-oxides having only aliphatic carbon atoms adjacently attached to the nitrogen atoms thereof and N-oxides of organic compounds having a pyridine nucleus. The reaction of compounds bearing Zerewitinoff-active hydrogen atoms with an organic polyisocyanate compound is well known. Also, it is known to employ tertiary amines to catalyze this reaction. It has now been found that significantly better catalytic activity may be obtained by employing N-oxides of tertiary amines as catalysts for the reaction. Thus, triethylamine is known to promote the reaction of a polyisocyanate compound with water; however, as will be noted from the examples, triethylamine oxide is at least six times as effective as triethylamine as a catalyst for promoting this reaction.

Any organic polyisocyanate compound including aromatic, aliphatic and cycloaliphatic types may be employed in the present invention. These compounds may contain two or more isocyanate radicals. Mixtures of these polyisocyanate compounds can be employed when desired.

Representative polyisocyanate compounds include toluene-2,4-diisocyanate,
1,6-hexamethylenediisocyanate,
1,4-tetramethylenediisocyanate,
1,10-decamethylenediisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other representative organic polyisocyanates include the polyisocyanates which are described in U.S. 2,683,730; the phenyl indane diisocyanates which are described in U.S. 2,855,385, the organic diisocyanates which are described in U.S. 2,292,443; and the organic triisocyanates which are described in U.S. 2,929,794.

The organic polyisocyanate compounds which can be used also include the isocyanate-terminated reaction products of a molar excess of any of the above described polyisocyanates with any of the polyhydroxy compounds described below. A representative example is an isocyanate-terminated polyalkyleneether polyurethane which is described in British Patent 733,624.

In carrying out the process of this invention the organic polyisocyanate is reacted with a compound bearing at least one Zerewitinoff-active hydrogen atom. Kohler in J. Am. Chem. Soc., 49, 3181 (1927), describes a test for such hydrogen atoms. General discussions of typical reactions of organic isocyanates and compounds having active hydrogen atoms are presented in the following review articles: Chem. Rev., 43, pp. 207–211 (1948); Chemistry of Organic Isocyanates, HR-2, Elastomers Division, E. I. du Pont de Nemours and Co., Inc., Wilmington 98, Delaware. In general, these hydrogen atoms are attached to carbon, oxygen, nitrogen or sulfur atoms. Compounds containing one or more of the following groups will have active hydrogen atoms: acetamido, primary amino, secondary amino, amido, carbamyl, carboxyl, diazoamino, hydrazino, hydrazo, hydrazono, hydroxamino, hydroxyl, imido, imino, isonitro, isonitroso, mercapto, nitroamino, xamyl, sulfamino, sulfamyl, sulfin, sulfo, thiocarbamyl, triazino, ureido, ureylene, and urethaneo. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, —CSNH$_2$. Representative examples of these compounds include water, hydrogen sulfide, ammonia, the aliphatic mono- and polyols described hereinafter, phenol, p-cresol, hydroquinone, n-butyl mercaptan, dodecyl mercaptan, 1,2-ethanedithiol, mercaptoethanol, thiophenol, m-chlorothiophenol, n-hexylamine, octadecylamine, p-aminophenol, piperidine, piperazine, ethanolamine, diethylamine, methyloctadecylamine, propylenediamine, hexamethylenediamine, ethylenediamine, aniline, m-phenylenediamine, toluene-2,4-diamine, cumene-2,4-diamine, 4,4'-methylenedianiline, 4,4'-methylenebis(2-chloroaniline), urea, guanidine, N-methylaniline, β-naphthylamine, aminopropionic acid, acetic acid, myristic acid, β-hydroxypropionic acid, succinic acid, adipic acid, benzoic acid, 4-hydroxybenzoic acid, terephthalic acid, isoterephthalic acid, 4-aminobenzoic acid, acetamide, N-β-hydroxyethyl propionamide, succinamide, adipamide, acetanilide, benzanilide, 4-aminobenzamide, sulfanilamide, 1,4-cyclohexanedisulfonamide, 1,3-propanedisulfonamide, benzene sulfonic acid, and 1,2-ethanedisulfonic acid. Synthetic Organic Chemistry, R. B. Wagner and H. D. Zook, J. Wiley & Sons, Inc., N.Y., 1953, contains tables listing many other representative compounds of these types. Polymers containing urethane

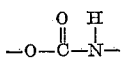

and ureido

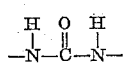

groups are also suitable here. Enolizable compounds such as β-ketoesters and β-diketones have carbon atoms bearing Zerewitinoff-active hydrogen atoms. Representative examples include acetyl acetone

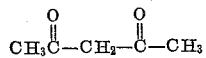

1,3-cyclohexanedione, and ethyl acetoacetate

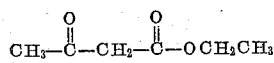

Other enolizable compounds include nitroalkanes such as nitromethane and malonic esters such as diethyl malonate.

Mixtures of active hydrogen compounds can be employed. Those skilled in the art will readily recognize that many of them are reactive toward each other (e.g. amines and carboxylic acids); thus in many cases it is best to react them separately with the organic polyisocyanate.

In a preferred embodiment of the present invention, any organic compound having at least one alcoholic hydroxyl group as its sole isocyanate reactable functionality is employed either alone or in combination with water for reaction with the organic polyisocyanate compound. Mixtures of two or more of these hydroxy compounds can be employed when desired. Representative examples of suitable alcohols can be found on pp. 226-228 of The Systematic Identification of Organic Compounds, R. L. Shriner and R. C. Fuson, 3rd ed., 1948, John Wiley & Sons, Inc., N.Y.; Synthetic Organic Chemistry, R. B. Wagner and H. D. Zook, 1953, John Wiley & Sons, Inc., N.Y., Table 11 (pp. 182-193) and Tables 13 and 14 (pp. 197-202). Representative examples of low molecular weight dihydroxy compounds can be found on pp. 193-196 of Synthetic Organic Chemistry, supra. Further examples include alkylene oxide modified polyols such as diethyl glycol,
(2-hydroxyethoxy)-1-propanol,
4-(2-hydroxyethoxy)-1-butanol,
5-(2-hydroxyethoxy)-1-pentanol,
3-(2-hydroxypropoxy)-1-propanol,
4-(2-hydroxypropoxy)-1-butanol,
5-(2-hydroxypropoxy)-1-pentanol,
1-(2-hydroxyethoxy)-2-butanol,
1-(2-hydroxyethoxy)-2-pentanol,
1-(2-hydroxyethoxy)-2-hexanol,
1-(2-hydroxyethoxy)-2-octanol,
1-(2-hydroxypropoxy)-2-butanol,
1-(2-hydroxypropoxy)-2-propanol,
1-(2-hydroxypropoxy)-2-hexanol,
1-(2-hydroxypropoxy)-2-octanol,
3-(2-hydroxyethoxy)-1,2-propanediol,
3-(2-hydroxypropoxy)-1,2-propanediol,
6-(2-hydroxyethoxy)-1,2-hexanediol,
6-(2-hydroxypropoxy)-1,2-hexanediol and
2,4-dimethyl-2-(2-hydroxyethoxy)methylpentanediol-1,5.

Ethylenically unsaturated low molecular weight diols may be employed. These include 3-allyloxy-1,5-pentanediol, 3-allyloxy-1,2-propanediol, 2-allyloxymethyl-2-methyl-1,3-propanediol, 2-methyl-2-[(4-pentenyloxy)methyl]1,3-propanediol and 3-(o-propenylphenoxy)-1,2-propanediol; others are listed in U.S. 2,927,098, and 2,854,486. Representative examples of low molecular weight polyols having at least 3 hydroxyl groups include: glycerol, 1,2,6 - hexanetriol, 1,1,1 - trimethylolpropane, 1,1,1-trimethylolethane, pentaerythritol, mannitol, galactitol, talitol, iditol, allitol, altritol, gulitol, arabitol, ribitol, xylitol, lyxitol, erythritol, threitol, 1,2,5,6-tetrahydroxyhexane, meso-inositol, sucrose, glucose, galactose, mannose, fructose, xylose, arabinose, dihydroxyacetone, glucose-α-methyl-glucoside, 1,1,1 - tris[(2-hydroxyethoxy) methyl]ethane, and 1,1,1-tris[(2-hydroxypropoxy)methyl]propane. Other examples are included in U.S. 2,917,-468. The following classes are representative of the hydroxyl-terminated polymers which can be used in the present invention: the hydroxyl-terminated polyhydrocarbons which are described in U.S. 2,877,212; the hydroxyl-terminated polyformals which are described in U.S. 2,870,097; the fatty acid triglycerides which are described in U.S. 2,833,730 and U.S. 2,787,601; the hydroxyl-terminated polyesters which are described in U.S. 2,698,838; U.S. 2,921,915; U.S. 2,591,884; U.S. 2,866,-762; U.S. 2,850,476; U.S. 2,602,783; U.S. 2,729,618; U.S. 2,779,689; U.S. 2,811,493, and U.S. 2,621,166; the hydroxy-methyl-terminated perfluoromethylenes which are described in U.S. 2,911,390 and U.S. 2,902,473; the polyalkyleneether glycols which are described in U.S. 2,808,391 and British 733,624; the polyalkylenearyleneether glycols which are described in U.S. 2,808,391; the polyalkyleneether triols which are described in U.S. 2,866,774; polyvinyl alcohol and cellulose.

Insofar as the operation of the present invention is concerned, the molar proportions of the polyisocyanate compounds and the compounds bearing Zerewitinoff-active hydrogen atoms can vary widely. Those skilled in the art can determine the proportions of reactants best suited for a particular purpose. For example, when making polyurethane elastomers one often uses approximately equimolar amounts of glycol and diisocyanate; when making polyurethane foams by reacting isocyanate-terminated polyurethanes and water, one often provides 0.5 mole of water for every NCO-group present.

The process of the present invention can be operated at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. In particular, one can empirically determine a temperature at which the mixed reactants are fluid enough to be stirred satisfactorily but not so volatile as to be lost. In general, the temperature can range between about 20° C. and 150° C. Lower temperatures are sometimes preferred when using the aliphatic amines and hydrazine. In the case of the less reactive compounds, such as glycols, it is possible to operate at temperatures below 20° C. but the reaction rate is often too slow for convenience. At temperatures above 150° C. the reaction products, particularly the phenolic urethanes, may dissociate to an undesired extent.

If desired, the reaction may be carried out in an inert solvent. Representative solvents include tetrahydrofuran, o-dichlorobenzene, chlorobenzene, xylene, methylisobutyl ketone, toluene and ethylacetate. In general, the solvent should be free from isocyanate-reactable groups such as groups bearing Zerewitinoff-active hydrogen atoms.

The process of the present invention may be carried out either as a continuous operation or as a batch operation. The catalyst can be added to the reactants at any time. For example, the catalyst can be introduced in a single portion or incrementally in a continuous or intermittent fashion to a mixture of an organic polyisocyanate compound and an organic hydroxy compound to accelerate urethane formation. If water is subsequently introduced, the catalyst then accelerates the isocyanate-water reaction which generates carbon dioxide. A foam can be prepared by this procedure. In another representative procedure for preparing a foam, the catalyst is added to an organic polyol which is then mixed simultaneously with an organic polyisocyanate and water to make a "one-shot" foam.

For best results the catalyst should be well dispersed in the reaction system. In general, one avoids adding the catalyst to the organic polyisocyanate. When water or an amine is a reactant, it is preferred to dissolve the catalyst in it and thereafter contact this mixture with the remaining reactants. Tetrahydrofuran, o-dichlorobenzene, and liquid tertiary aliphatic amines such as N-ethylmorpholine are suitable solubilizing agents for the catalyst. One skilled in the art can empirically determine how much agent is needed for a particular system.

The amount of catalyst employed for the reaction can range over wide limits. Those skilled in the art can readily select proportions which will provide the degree of catalytic acceleration desired. In general, the greater the catalyst concentration, the greater the acceleration. About 0.005 to 0.50 mole of tertiary amine N-oxide is needed for every mole of isocyanate groups to which it is added. The preferred concentration ranges between about 0.01 and 0.15 mole. Concentrations below 0.005 mole can be used, but the catalytic effect is not enough to be convenient for some purposes. When concentrations above 0.50 mole are used, the reaction rate may be inconveniently fast. When the catalysts used have two N-oxide groups, the catalyst concentration ranges from about 0.0025 to 0.25 mole. The concentration of N-oxide groups, in any case, ranges from about 0.005 to 0.50 mole.

The catalyst employed in the process of the present invention is a tertiary amine N-oxide. These N-oxides are prepared by reaction of the parent tertiary amine with hydrogen peroxide. In a representative procedure, a water-soluble tertiary amine is reacted at about 25–30° C. with a 2-fold molar excess of 10% aqueous hydrogen peroxide for about 48 hours. Completion of reaction is indicated by the disappearance of the characteristic amine odor. The residual hydrogen peroxide is catalytically destroyed by agitation with ruthenium on carbon. After filtering, the water is removed by distillation. The N-oxide thereby obtained is recrystallized from common solvents such as ethyl acetate or benzene. When water-insoluble tertiary amines are employed, acetone can be added to the water to effect solubilization.

Two classes of tertiary amine N-oxides may be employed in the present invention. The first class includes N-oxides of tertiary amines having only aliphatic carbon atoms adjacently attached to the nitrogen atom or atoms thereof. Although there are no aromatic groups attached to the nitrogen atom, they may be present elsewhere in the molecule. The second class includes N-oxides of organic compounds having a pyridine nucleus. These compounds may, if desired, contain an N-oxide of a tertiary nitrogen atom of the type characteristic of the first class. All of these amine oxides are free from isocyanate-reactable substituents such as isocyanate groups, 1,3-diazacyclobutane-2,4-dione groups, and groups bearing Zerewitinoff-active hydrogen atoms such as primary amino groups, secondary amino groups, amido groups, carboxyl groups, hydroxyl groups, mercapto groups, ureido groups, urethaneo groups, and the like. Mixtures of two or more of these tertiary amine N-oxides may be employed.

Representative examples of types of amine N-oxides included within the first class are the N-oxides of tertiary alkylamines, tertiary cycloalkylamines, and N-alkyl piperidines, N-alkyl morpholines and the N,N'-dioxides of N,N'-dialkylpiperazines, and N,N,N',N'-tetraalkylalkylenediamines. In general, these tertiary amines have from about 3 to 21 carbon atoms. Representative amine N-oxides are:

dimethyldodecylamine N-oxide,
dimethyltetradecylamine N-oxide,
diethylhexadecylamine N-oxide,
methylethyloctadecylamine N-oxide,
trimethylamine N-oxide,
diethylmethylamine N-oxide,
tri-n-propylamine N-oxide,
tri-n-butylamine N-oxide,
tri-n-amylamine N-oxide,
diethylisopropylamine N-oxide,
dimethyl-n-butylamine N-oxide,
dimethylcyclohexylamine N-oxide,
N-methylpiperdine N-oxide,
N-ethylpiperidine N-oxide,
N-propylpiperidine N-oxide,
N-isopropylpiperidine N-oxide,
N-n-butylpiperidine N-oxide,
N-isobutylpiperidine N-oxide,
N-isoamylpiperidine N-oxide,
N-methyl-3-isopropylpiperidine N-oxide,
2-methyl-N,3-diethylpiperidine N-oxide,
N-methylmorpholine N-oxide,
N-ethylmorpholine N-oxide,
N,N'-dimethylpiperazine N,N'-dioxide,
N,N'-diethylpiperazine N,N'-dioxide,
N,N'-dipropylpiperazine N,N'-dioxide,
N,N'-diisoamylpiperazine N,N'-dioxide,
triethylenediamine N,N'-dioxide,
N,N,N',N'-tetramethyltrimethylenediamine N,N'-dioxide,
N,N,N',N'-tetraethyltrimethylenediamine N,N'-dioxide,
N,N,N',N'-tetramethyltetramethylenediamine N,N'-dioxide, and
N,N,N',N'-tetramethylhexamethylenediamine N,N'-dioxide.

Representative examples of types of amine N-oxides included within the second class are pyridine N-oxides, quinoline N-oxides, and isoquinoline N-oxides. In general, these amines have from about 5 to 18 carbon atoms. Representative amine N-oxides are:

pyridine N-oxide,
3-chloropyridine N-oxide,
3,5-dibromopyridine N-oxide,
4-methylpyridine N-oxide,
3-ethylpyridine N-oxide,
2-methylpyridine N-oxide,
4-tert-butylpyridine N-oxide,
3-phenylpyridine N-oxide,
3-(p-isopropyl)benzylpyridine N-oxide,
4-p-isopropylphenethylpyridine N-oxide,
4-p-methoxyphenethylpyridine N-oxide,
3-benzhydrylpyridine N-oxide,
quinoline N-oxide,
8-chloroquinoline N-oxide,
4-bromoquinoline N-oxide,
3-methylquinoline N-oxide,
4-ethylquinoline N-oxide,
7-isopropylquinoline N-oxide,
5,6-benzoquinoline N-oxide,
6-chloro-4-methylquinoline N-oxide,
isoquinoline N-oxide,
8-chloroisoquinoline N-oxide,
4-bromoisoquinoline N-oxide, and
6-methylisoquinoline N-oxide.

The following examples will better illustrate the nature of the present invention; however, the invention is not intended to be limited to these examples. Parts are by weight unless otherwise indicated.

EXAMPLE 1

The catalyst and water were added at 30° C. to 25 milliliters of tetrahydrofuran and the solution obtained was introduced into a 125-ml. Erlenmyer flask agitated by a magnetic stirrer and fitted with a 2-hole rubber stopper holding a glass burette and a gas outlet tube. The reaction was started by introducing, from the burette, a 10 percent by weight solution of toluene-2,4-diisocyanate in tetrahydrofuran at 30° C. The carbon dioxide generated by the isocyanate-water reaction which resulted passed through the outlet tube (of glass) to a T-joint attached to and F and M Model 119C gas chromatograph having a 5-ft. column packed with firebrick coated with Perkin Elmer silicone grease type 0; a helium stream flowed into the other side of the T-joint at the rate of 20 cc./min. The height of the instrument chart tracing for carbon dioxide at any instant was taken as a relative measure of the amount of carbon dioxide generated at that moment. The time required for the carbon dioxide band to reach a maximum and the height of that maximum were recorded for each run and provided a comparative measure of catalyst reactivity. Table I which follows shows the data obtained:

EXAMPLE 3

(A) Isopropyl alcohol (8.40 grams, 0.14 mole) and toluene-2,4-diisocyanate (12.19 grams, 0.07 mole) were agitated in a dry Erlenmeyer flask at 25° C. in 25 cc. of o-dichlorobenzene under an atmosphere of dry nitrogen. Aliquots (1 ml.) were removed at various intervals and analyzed for residual isocyanate (back titration of excess di-n-butylamine with standard hydrochloric acid). Table III gives the data obtained.

(B) The procedure of A above was repeated except that N-ethylmorpholine (0.092 gram, 0.0008 mole) was added. Table III gives the data obtained.

(C) The procedure of A above was repeated except that N-ethylmorpholine N-oxide (0.1048 gram, 0.0008 mole) was added. Table III gives the data obtained.

*Table III*

PERCENT TDI REACTED

| Time (min.) | A | B | C |
|---|---|---|---|
| 3 |  | 28 | 48 |
| 6 | 4 | 40 | 54 |
| 15 | 10 | 52 | 62 |
| 30 | 24 | 55 | 68 |
| 45 | 40 | 58 | 70 |
| 120 | 44 | 66 | 74 |
|  | 51 |  |  |

*Table I*

| Parent Amine | Moles of Amine | Moles of Amine Oxide | Moles of TDI [1] | Moles of $H_2O$ | Maximum Chart Reading | Minutes to Chart Maximum |
|---|---|---|---|---|---|---|
| Triethylamine | 0.0008 |  | 0.0035 | 0.0035 | 10,200 | 13 |
|  |  | 0.0008 | 0.0035 | 0.0035 | 93,200 | ≅2 |
| N-Ethylmorpholine | 0.0008 |  | 0.0035 | 0.0035 | 3,000 | 16 |
|  |  | 0.0008 | 0.0035 | 0.0035 | >102,400 | ≅2 |
|  |  | 0.0001 | 0.0035 | 0.0035 | 68,600 | ≅2 |
| Dimethyloctadecylamine | 0.0008 |  | 0.0035 | 0.0035 | 2,300 | 20 |
|  |  | 0.0008 | 0.0035 | 0.0035 | 11,800 | 2.5 |
| Pyridine | 0.0008 |  | 0.0035 | 0.0035 | 2,300 | 24 |
|  |  | 0.0008 | 0.0035 | 0.0035 | 8,600 | 16 |
| Diethylcyclohexylamine | 0.0008 |  | 0.0035 | 0.0035 | 3,200 | 18 |
|  |  | 0.0008 | 0.0035 | 0.0035 | 7,200 | 2 |
| N-Ethylmorpholine | 0.0008 |  | [2] 0.0035 | 0.0035 | ([3]) | >60 |
|  |  | 0.0008 | [2] 0.0035 | 0.0035 | 4,800 | 24 |

[1] TDI—toluene-2,4-diisocyanate.
[2] 1,6-hexyamethylene diisocyanate used instead of toluene-2,4-diisocyanate.
[3] Could not be determined.

EXAMPLE 2

The procedure of Example 1 was repeated except that in certain runs isopropyl alcohol was mixed with the catalyst and water before the diisocyanate was introduced. Table II, which follows, gives the proportions of reactants used and the results obtained. The ratio of the maximum peak height for the system containing the isopropyl alcohol to the maximum peak height for the system without isopropyl alcohol had a smaller value when the catalyst was the amine oxide than it did when the amine was employed. This ratio decrease indicates that the amine oxide catalyzed urethane formation leaving less isocyanate available to generate carbon dioxide.

EXAMPLE 4

REACTION CONDITIONS

| Solution A | Solution B | Solution C |
|---|---|---|
| .14 g.-mole of reactant. No catalyst. | .14 g.-mole of reactant. 0.0008 g.-mole N-ethylmorpholine. | .14 g.-mole of reactant. 0.0008 g.-mole N-Ethyl Morpholine N-oxide. |
| Diluted to 100 ml. with solvent. | Diluted to 100 ml. with solvent. | Diluted to 100 ml. with solvent. |

The above solutions were mixed with 0.07 g.-mole of toluene-2,4-diisocyanate (TDI) in an Erlenmeyer flask at room temperature. Samples (1.0 ml.) were withdrawn periodically and added to dibutylamine solution; the ex-

*Table II*

| Amine | Moles of Amine | Moles of Amine Oxide | Moles of TDI | Moles of $H_2O$ | Moles of Isopropanol | Maximum Chart Readings | Ratio of Chart Maxima |
|---|---|---|---|---|---|---|---|
| Triethylamine | 0.0008 |  | 0.0035 | 0.0035 | 0.007 | 7,800 | 0.76 |
|  | 0.0008 |  | 0.0035 | 0.0035 |  | 10,200 |  |
|  |  | 0.0008 | 0.0035 | 0.0035 | 0.007 | 44,500 | 0.50 |
|  |  | 0.0008 | 0.0035 | 0.0035 |  | 93,200 |  | cess dibutylamine was back titrated with HCl and the percent unreacted TDI calculated.

PERCENT TDI (REACTED)

[Reactant—p-cresol. Solvent—o-dichlorobenzene]

| Time (min.) | A | B | C |
|---|---|---|---|
| 10 | 0.5 | 17 | 6 |
| 20 | 1 | 39 | 30 |
| 30 | 1 | 52 | 55 |
| 40 | 1.5 | 62 | 70 |
| 50 | 1.5 | 70 | 86 |
| 60 | 2 | 74 | 92 |
| 120 | 4.5 | 82.5 | 95 |
| 180 | 4.5 | 86 | 95.5 |
| 240 | 4.5 | 88 | 96 |
| 300 | 4.5 | 90 | 96.5 |

[Reactant—Acetanilide. Solvent—tetrahydrofuran]

| Time (min.) | A | B | C |
|---|---|---|---|
| 10 | 0 | 2.5 | 20.0 |
| 20 | 0.5 | 3.5 | 23.5 |
| 30 | 1.0 | 4.5 | 26.0 |
| 40 | 1.5 | 5.5 | 27.0 |
| 50 | 2.5 | 6.0 | 28.0 |
| 60 | 3.0 | 6.5 | 28.5 |
| 120 | 4.0 | 8.0 | 31 |
| 180 | 5.5 | 9.5 | 33.5 |
| 200 | 6.0 | 10.0 | 34.5 |

[Reactant—Acetoacetic ester. Solvent—o-dichlorobenzene]

| Time (min.) | A | B | C |
|---|---|---|---|
| 10 | 0 | 4 | 20 |
| 20 | 3 | 5 | 21 |
| 30 | 4 | 6 | 23 |
| 40 | 4 | 7 | 24 |
| 50 | 4 | 7.5 | 24.5 |
| 60 | 4 | 8.0 | 25 |
| 120 | 4 | 9.0 | 28.5 |
| 180 | 4 | 10.5 | 30.5 |
| 240 | 4 | 11.0 | 31 |

[Reactant—thiophenol. Solvent—o-dichlorobenzene]

| Time (min.) | A | B | C |
|---|---|---|---|
| 10 | 0 | 0 | 0 |
| 20 | 3 | 20 | 50 |
| 30 | 4 | 31 | 58 |
| 40 | 4 | 42.5 | 64 |
| 50 | 4.5 | 50 | 67 |
| 60 | 5 | 55 | 70 |
| 120 | 8 | 61 | 72 |

As many widely different embodiments of this invention may be made without departing from the spirit and scope thereof, it is to be understood that this invention is not limited to the specific embdiments thereof except as defined in the appended claims.

What is claimed is:

1. In the process of reacting an organic polyisocyanate compound with at least one compound having at least one Zerewitinoff-active hydrogen atom, the improvement comprising carrying out said reaction in contact with a catalytic amount of a tertiary amine N-oxide having no isocyanate reactable substituents, said N-oxide being selected from the group consisting of tertiary amine N-oxides having only aliphatic carbon atoms adjacently attached to the nitrogen atoms thereof and N-oxides of organic compounds having a pyridine nucleus.

2. A process according to claim 1 wherein the organic polyisocyanate compound is toluene-2,4-diisocyanate.

3. A process according to claim 2 wherein the compound having at least one Zerewitinoff-active hydrogen atom is a polyalkyleneether polyol.

4. A process according to claim 2 wherein the compound having at least one Zerewitinoff-active hydrogen atom is a polyester polyol.

5. A process according to claim 1 wherein the tertiary amine N-oxide is N-ethylmorpholine N-oxide.

6. A process according to claim 1 wherein the tertiary amine N-oxide is triethylamine N-oxide.

7. A process according to claim 1 wherein from 0.01 to 0.15 mole of tertiary amine N-oxide is employed for every mole of isocyanate groups.

8. A process according to claim 1 wherein the organic polyisocyanate is 1,6-hexamethylene diisocyanate.

9. A process according to claim 1 wherein said N-oxides of organic compounds having a pyridine nucleus are selected from the group consisting of pyridine N-oxides, quinoline N-oxides, and isoquinoline N-oxides.

References Cited by the Examiner

UNITED STATES PATENTS

| 2,740,743 | 4/56 | Pace | 260—77.5 XR |
| 2,879,250 | 3/59 | Eisenmann et al | 260—75 XR |
| 2,894,919 | 7/59 | Simon et al. | 260—75 XR |
| 2,977,330 | 3/61 | Brower | 260—77.5 XR |

FOREIGN PATENTS 748,697   5/56   Great Britain.

OTHER REFERENCES

Whitmore: "Organic Chemistry," second edition, May 1951, Van Nostrand Company, New York, page 173.

LEON J. BERCOVITZ, *Primary Examiner.*

H. N. BURSTEIN, J. R. LIBERMAN, *Examiners.*